Sept. 5, 1933.  J. H. KOHLER  1,926,007
PACKING FOR CENTRIFUGAL PUMPS AND VALVES
Filed April 4, 1931
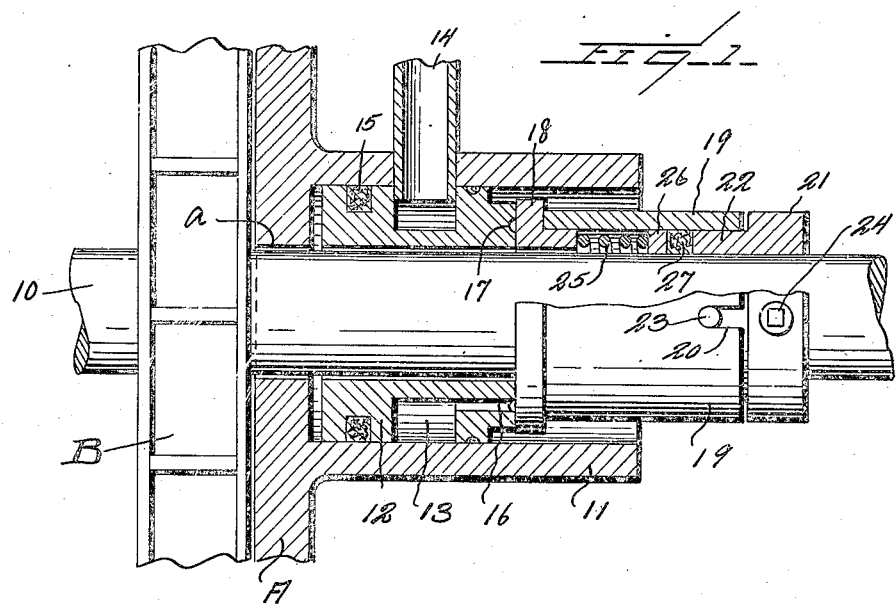
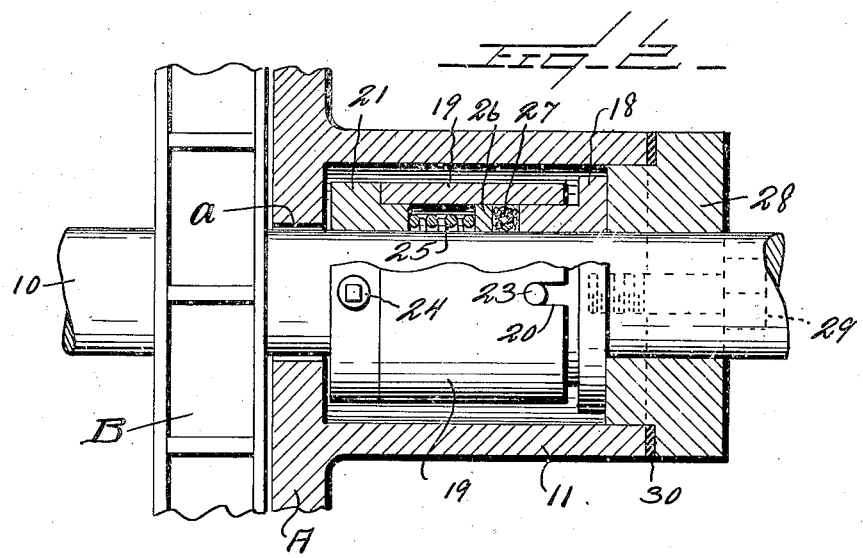
Inventor
J. H. Kohler
By Watson E. Coleman
Attorney Patented Sept. 5, 1933

1,926,007

UNITED STATES PATENT OFFICE 1,926,007

PACKING FOR CENTRIFUGAL PUMPS AND VALVES

Joseph H. Kohler, Hammond, Ind., assignor of one-half to Arthur R. Tuck, Hammond, Ind.

Application April 4, 1931. Serial No. 527,811

3 Claims. (Cl. 286—7)

This invention relates to improvements in packing for centrifugal pumps and valves and particularly for all structures wherein a shaft passes through an opening in a casing and means must be provided for preventing the leakage of fluid through said opening and around said shaft.

The general object of my invention is to produce a packing means for this purpose without the use of a gland, a metallic packing or fibrous packing and which is adapted to fit any stuffing box without changes.

Where there is line pressure, pressure acts also upon the stuffing box and the continued wear on the packing will cause leakage along the shaft. The ordinary packing employed in stuffing boxes is inadequate for retarding such leakage unless the packing is maintained under so great a pressure against the shaft as will afford a large amount of friction. It is extremely difficult for even an experienced mechanic to estimate the proper amount of pressure which must be applied upon the packing to stop leakage and at the same time not produce an undue amount of friction or wear. Furthermore the ordinary packing is dangerous and often causes destruction of property and sometimes loss of lives. If a large amount of pressure is forced against the packing to retard the leak, an undue amount of friction will be produced which will cause the shaft to become hot and may also lead to serious results and cause an explosion while pumping volatile explosive liquids and if the pressure on the packing be relaxed to reduce friction upon the shaft, this will cause the pump to leak, the rotating shaft will throw a fine spray of liquid, and any person passing by may be seriously burned about the hands and face, particularly if the liquid happens to be acid. Moreover this leakage means a waste which may run to 500 gallons per day under some circumstances. With this problem in mind, one object of my invention is to provide a packing mechanism in which the parts shall rotate with the shaft.

A further object is to provide spring actuated means continuously pressing the packing toward the axis of the shaft and to provide simple means for interrupting the directness of the passage through which possible leakage can occur along the surface of the shaft.

A further object is to provide resilient means acting to force two kinds of metals toward each other to create a friction or seal joint.

Another object is to provide a block mounted within the stuffing box which will take the place of an ordinary gland and take the place of a metallic and fibrous packing.

Other objects will appear in the course of the following description.

My invention is illustrated in the accompanying drawing, wherein:—

Figure 1 is a longitudinal section partly in elevation of a stuffing box and packing therefor constructed in accordance with my invention;

Figure 2 is a like view to Figure 1, but showing the packing rearranged for accommodation within a closed stuffing box.

In the drawing, A designates the wall of a container of any suitable character and B an impeller mounted upon a shaft 10 which extends out through an opening $a$ in the wall A. Disposed concentrically to the shaft 10 and projecting from the wall is a cylindrical stuffing box 11. Disposed within this stuffing box is a cylinder block 12 having a circumferentially extending recess or chamber 13. A pipe 14 extends through the wall of the stuffing box 11 and into this chamber for the discharge of oil or grease into the chamber, this pipe being adapted to be connected to a grease cup or any other source of lubricant. The block 12 fits the wall 11, but does not fit the shaft, that is, the shaft is smaller than the interior diameter of the block. The block is formed with a groove having therein a ring 15 of packing material, this packing material bearing against the wall of the stuffing box. The object of this ring is to interrupt the directness of the passage through which possible leakage may occur. This ring is disposed between the chamber 13 and the wall A.

At the other end of the block 12, there is formed a groove 16 which contains a packing bearing against the inside face of the stuffing box and on the outer end face of the block 12, there is formed an oil groove 17. The object of the packing contained within the groove 16 is to prevent leakage from the oil well or chamber 13. The cylinder block 12 can be constructed of fibre, leather, wood or metal.

Disposed against the end face of the block 12 is a seal ring 18 which is angular in cross section. This seal ring has a highly polished face confronting the block 12 and frictionally engages this block. The longitudinally projecting portion of the seal ring is pressed into a sleeve 19. This sleeve at one end is formed with a longitudinally extending slot 20. Mounted upon the shaft 10 is a collar 21 angular in cross section to provide a portion 22 of less diameter than the body of the collar and which is loose within the end of the sleeve 19. A pin 23 projects outward from the portion 22 and into the slot 20. The adjusting collar 21 is held upon the shaft 10 for rotation therewith by means of the set screw 24. Thus the sleeve 19 and the seal ring 18 are caused to rotate with the shaft.

Disposed within the sleeve 19 and bearing at one end against the seal ring 18 is a coiled compression spring 25, the other end of this spring bearing against a washer 26 and disposed between this washer 26 and the end face of the collar 21 is a ring 27 of suitable packing material which is fitted to bear against the inside wall of the sleeve 19 and also to bear against the outer circumference of the shaft and to interpose between and bear against both the washer 26 and the end face of the collar 22.

It will be seen that the spring 25 continuously urges the washer or ring 26 against this packing material 27 and thus causes the packing material to be forced toward the axis of the shaft, this spring 25 also acting to continuously press the rotating seal ring 18 against the stationary block 12, thus creating a friction or a seal joint. The rotation of this ring 18 against the end face of the block 12 will, of course, grind down any inequalities in the two opposed faces so that they will have a very tight fit one against the other.

It is to be particularly noted that the seal ring 18 has a greater internal diameter than the shaft and it has practically the same internal diameter as the block 12 and the opening a in the wall. Thus the fluid pressure within the container is carried through to the chamber defined by the sleeve 19, the ring 26 and the inner end of the seal ring 18. Thus the line pressure is equalized upon the seal ring and thus the fluids or liquids within the casing A transmit their pressures to the end face of the seal ring, forcing the seal ring against the block 12 and also forcing the ring 26 against the packing ring 27. Thus it will be seen that this pressure assists the action of the spring 25 instead of acting against the action of said spring as would be the case did the seal ring 18 fit closely around the shaft, in which case there would be a tendency for the seal ring to be forced away from the face of the block 12 and counteract the action of the spring 25.

In Figure 2, I have illustrated another embodiment of my invention wherein all of the several devices are arranged within a stuffing box.

In this case, the stuffing box is designated 11 and is closed at its outer end by means of a cap 28 through which the shaft passes. This cap is held in place by screws 29 and a gasket 30 is disposed between the cap and the end of the stuffing box. The cap has a portion projecting into the stuffing box. In this case, the seal ring 18, which is the same as the seal ring heretofore described, bears flat against the end of the cap 28. The seal ring is angular in cross section and is loosely surrounded by the sleeve 19 which is formed, as before stated, with the slot 20, the seal ring having a pin 23 which engages in said slot. Disposed in the opposite end of the stuffing box adjacent the wall of the casing A is a collar 21 held in place by the set screw 24 as heretofore described, this collar being angular in cross section and being pressed into the end of the sleeve 19. A spring 25 bears at one end against this collar and at the other end against a washer 26 which in turn bears against a packing ring 27. The same numerals have been used for these parts to indicate that the same structure is used in Figure 1 as in Figure 2 only the parts are shifted relative to each other. In this case, of course, the collar 21 rotates with the shaft and the sleeve 19 rotates with the shaft as does the seal ring 18, the spring 25, the washer 26 and the packing 27. In this case, also, the spring 25 bearing against the ring 26 urges the packing 27 toward the axis of the shaft. The seal ring 18 grinds a seat against the face of the cap 28 so as to secure a tight joint which will not permit the leakage of pressure between these two faces.

It will be seen in this construction also that pressure from within the casing A will pass into the stuffing box exteriorly of the parts 21, 19 and 18 and that there is a space between the outwardly extending flange of the seal ring and the end of the sleeve 19 so that the pressure within the stuffing box will act to urge this seal ring against the cap 28. Pressure also passes between the collar 21 and the shaft into the space defined by the sleeve 19 and the collar 21 and this pressure will bear against the washer 26 assisting the spring 25 and urging this washer against the packing 27 and urging the seal ring against the member 28.

In Figure 1, the member 21 has a loose fit within the sleeve 19 while in Figure 2, the member 21 has a press fit within the sleeve 19. In Figure 1, the seal ring 18 has a press fit within the sleeve 19 whereas in Figure 2, the seal ring has a loose fit within the sleeve 19. It will be understood, of course, that there must be a loose connection at one end so that the spring will force the seal ring along the shaft as fast as it wears. All the members rotate with the shaft because they are frictionally engaged with one another.

I claim:—

1. The combination with a stuffing box, a shaft passing therethrough, of an annular element disposed within the stuffing box and held from rotation with the shaft, the annular element fitting the interior diameter of the stuffing box but being larger in interior diameter than the shaft, packing means carried by said element and bearing against the wall of the stuffing box, a seal ring surrounding the shaft and bearing against the end face of said element, an adjustable collar engaged with the shaft for rotation therewith, a sleeve carried by said collar and postively engaged for rotation therewith, the sleeve supporting the seal ring and the sleeve and seal ring being longitudinally shiftable with relation to the collar, a spring surrounding the shaft and urging the seal ring against said annular element, a washer fitting within the sleeve and against which the other end of the spring bears, and packing disposed between said washer and the adjacent end of the collar.

2. The combination with a stuffing box, a shaft passing therethrough, of an annular element disposed within the stuffing box and held from rotation with the shaft, the annular element fitting the interior diameter of the stuffing box but being larger in interior diameter than the shaft, packing means carried by said element and bearing aginst the wall of the stuffing box, a seal ring surrounding the shaft and bearing against the end face of said element, an adjustable collar engaged with the shaft for rotation therewith, a sleeve carried by said collar and positively engaged for rotation therewith, the sleeve supporting the seal ring and the sleeve and seal ring being longitudinally shiftable with relation to the collar, a spring bearing at one end against the seal ring and surrounding the shaft, a washer fitting within the sleeve and against which the other end of the spring bears, and packing disposed between said washer and the adjacent end of the collar, the annular element being formed to provide an annular lubricant containing chamber having a duct leading to that face of the annular element against which the seal ring bears, the seal ring having a relative diameter other than the diameter of the shaft whereby fluid pressure may pass into the space between the seal ring and the washer.

3. The combination with a stuffing box and a shaft passing through the end wall thereof, the opening for said shaft being larger than the shaft, of an annular element disposed within the stuffing box surrounding the shaft but larger in internal diameter than the shaft, packing carried by said element and bearing against the inner face of the stuffing box, the annular element having an annular oil chamber, means for conveying lubricant into said oil chamber, a collar mounted upon the shaft for rotation therewith, a sleeve surrounding a portion of the collar and extending inward toward said annular element concentrically to the shaft, the sleeve having positive rotation with the collar, but having free longitudinal movement, a seal ring carried at the inner end of said sleeve and bearing aginst the adjacent face of said element, a packing carried within the sleeve and bearing against the shaft, and a spring operatively bearing against the packing at one end and against the seal ring at the other end, the oil chamber of the annular element having a duct leading to the face of the annular element against which the seal ring bears.

JOSEPH H. KOHLER.